W. C. FRICK.
METHOD OF AND MEANS FOR MAKING TUBING.
APPLICATION FILED MAR. 9, 1908.
989,497.
Patented Apr. 11, 1911.
3 SHEETS—SHEET 1.
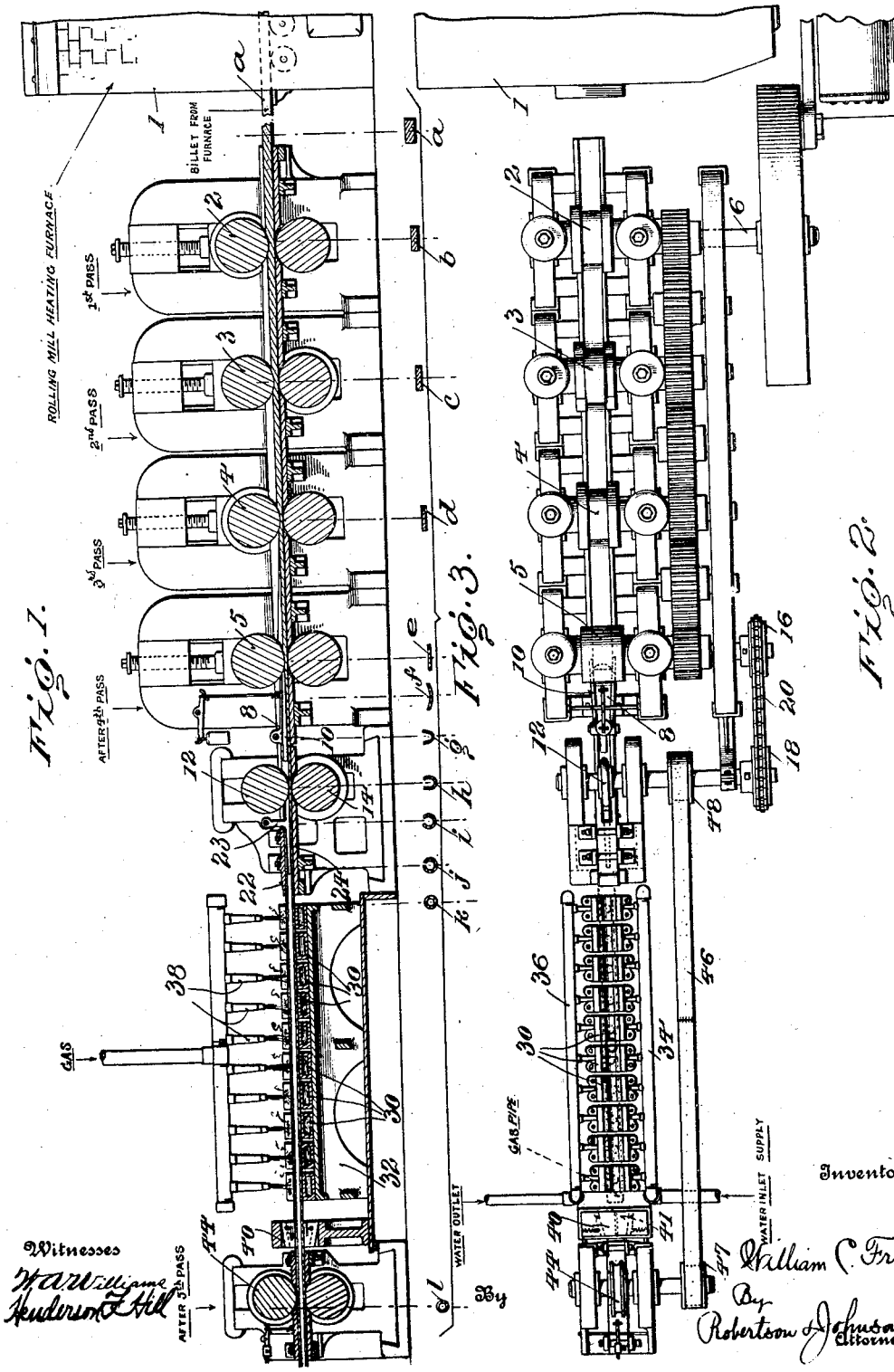

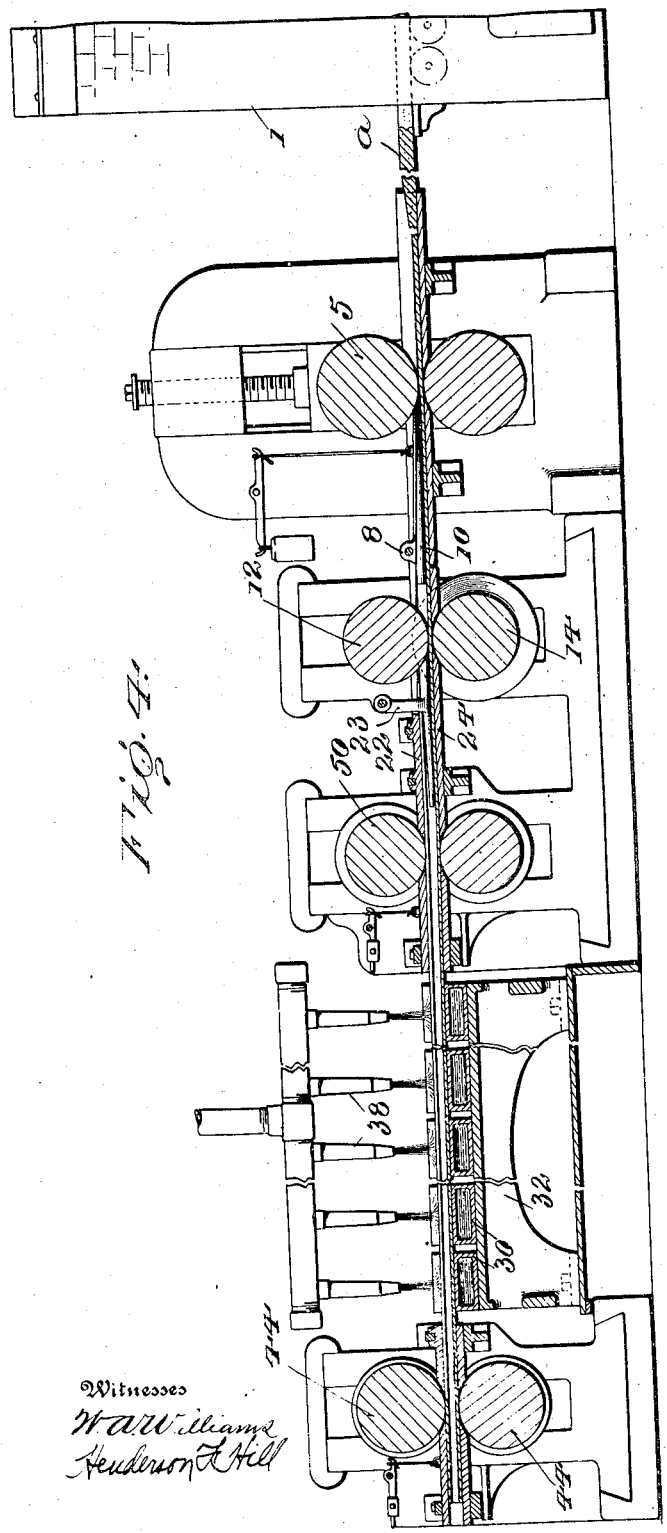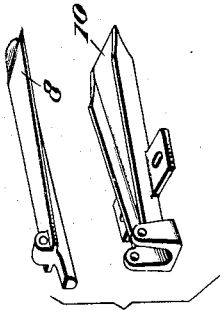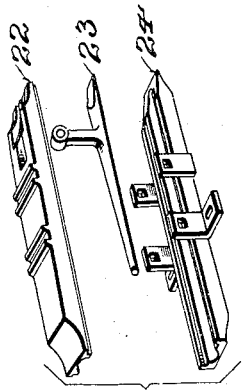

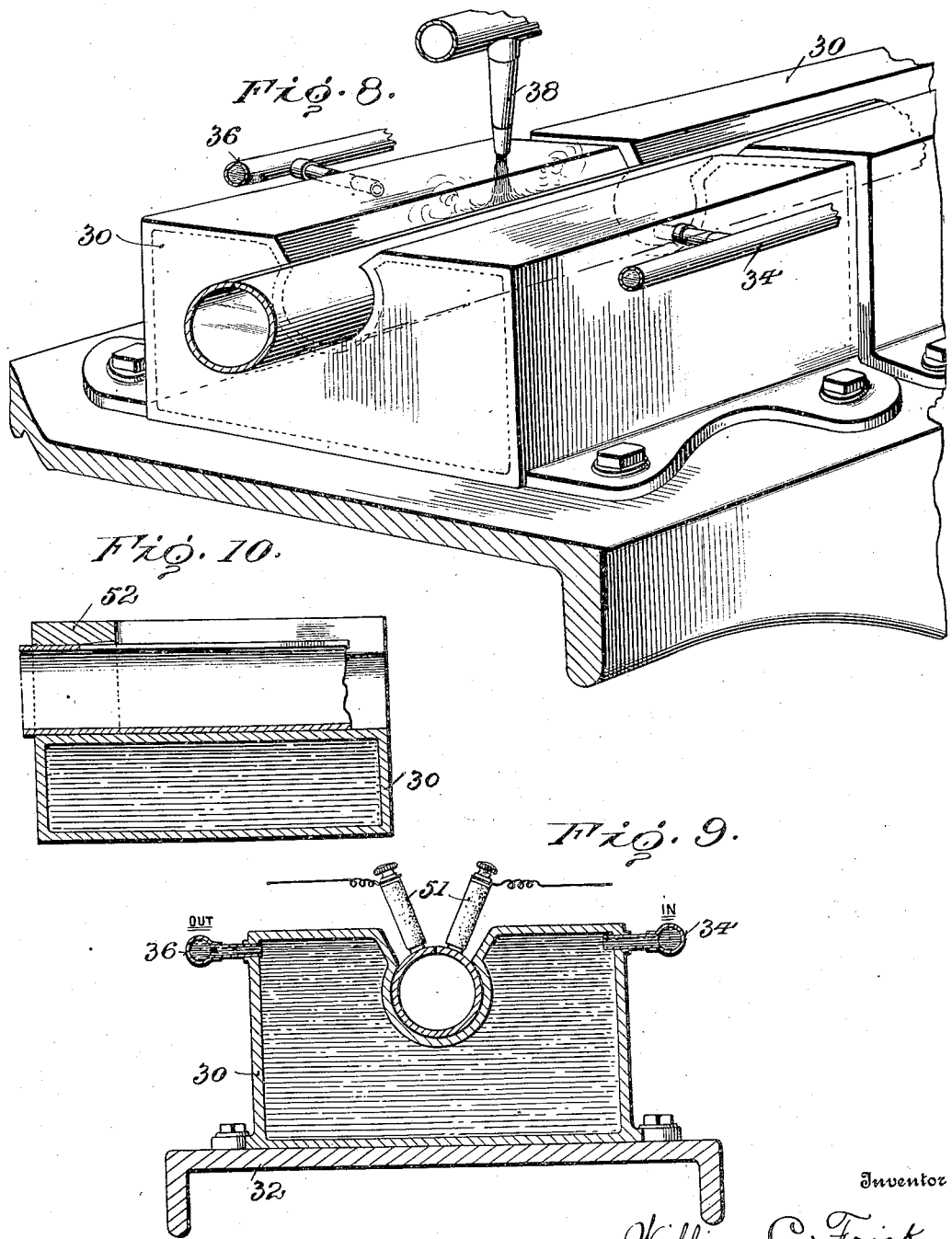

UNITED STATES PATENT OFFICE.

WILLIAM C. FRICK, OF DEAL BEACH, NEW JERSEY.

METHOD OF AND MEANS FOR MAKING TUBING.

989,497.

Specification of Letters Patent. Patented Apr. 11, 1911.

Application filed March 9, 1908. Serial No. 420,094.

*To all whom it may concern:*

Be it known that I, WILLIAM C. FRICK, a citizen of the United States, residing at Deal Beach, in the county of Monmouth and State of New Jersey, have invented certain new and useful Improvements in Methods of and Means for Making Tubing, of which the following is a specification.

My invention relates to improvements in the method of and means for manufacturing metal tubing, and its object is to produce tubing by one continuous and progressive method starting from the point where the metal leaves the rolling mill heating furnace and ending with the finished product, in the shape of welded tubing. By making tubing in this manner I am enabled to manufacture welded tubing direct from the rolling mill furnace and after the billet is passed through the rolling mill and is formed thereby it is, as fast as it is rolled, passed through the tube forming mechanism while still retaining a part of the heat imparted to it prior to its rolling. The now formed tubing, which as stated still has a portion of the initial heat which was given prior to its rolling, has its heat supplemented by additional successive and progressive heating until it reaches a welding heat, and then its two edges are welded or fused together. It will thus be seen that I am enabled to form a web or plate and rapidly, continuously and progressively, feed this hot plate, form it into a tube, add heat units successively and progressively until the already heated tube reaches the welding point, and then weld or fuse it.

It has heretofore been proposed to turn or bend a skelp from the roll train of a mill and form it into a tube ready for subsequent welding, but at this point the product is allowed to cool and thus loses all the heat imparted to it in the rolling mill furnace. It is also old to make a plate or skelp and allow it to cool in its finished flat shape, and then at a subsequent time and in another furnace again heat it, bend it into shape and weld it into a finished pipe, but by this method it is possible to weld a pipe of no greater length than from 30 to 40 feet since this is usually the capacity of the furnaces for reheating the skelp, or to state it in another way, it is impossible to weld it as rapidly as it is produced by the rolling mill. To repeat: In the existing methods of welding tubing there are no appliances by which a portion of the heat generated in the rolling mill heating furnace is saved and used in the final welding of the seam or joint of the finished tubing; and there is no appliance by which welded tubing is made from the slab, billet or pile placed in rolling mill heating furnaces and by the use of supplementary heat applied successively and progressively to the two edges of the bent or formed tube, the formed plate or skelp is rapidly, continuously and progressively welded as fast as the rolling mill rolls the slab or billet into skelp shape prior to its being formed into tube shape. I am enabled to accomplish the desired result by adding to the heat remaining in the skelp after the rolling thereof, supplemental heat at a plurality of places along the path of the tube until the remaining heat, supplemented by the additional heat, raises the heat of the formed tube, successively and progressively, until a welding heat is reached. By supplementing heat units successively and progressively to the already heated product of the rolling mill and its furnace, I am enabled to heat and weld the tubing as rapidly as the mill produces it.

In the drawings accompanying and forming part of this application and which it will be understood represent the preferable, though not necessary, embodiment of my invention: Figure 1 is a sectional view of my apparatus showing in conventional form part of the apparatus employed, it being understood that various appliances may be substituted for those shown. Fig. 2 is a top plan view of the apparatus shown in Fig. 1. Fig. 3 is a view showing the different shapes the metal assumes from the time it leaves the rolling mill heating furnace until it is formed in welded shape, the metal first passing through the different "passes" of the rolling mill, then being bent gradually into tube shape, and finally welded. Fig. 4 is a view similar to Fig. 1, on a much enlarged scale, showing a modified form of my invention, but with the first three rolls of the rolling mill and part of the supplemental heating devices omitted, in order to show the parts on a larger scale. Fig. 5 is a perspective view showing the product of my method and apparatus from the time the metal leaves the furnace until it is formed into the tube. Figs. 6 and 11

7 are perspective details of part of the means for forming the skelp into tube shape, it being understood that these devices are old and well known in the art. Fig. 8 is a perspective view of the means for holding the tube into shape as its heat is successively and progressively augmented. Fig. 9 is a sectional view of the device shown in Fig. 8, except that an electric heating device is shown. Fig. 10 is a sectional detail of a modified form of the last holding device wherein the tube is both heated and welded.

Referring now to the details of the drawings by numerals: 1 designates, in conventional form, a rolling mill heating furnace delivering a billet to any form of rolling mill which, as shown in the drawings, is of continuous type and comprises four sets of rolls, 2, 3, 4 and 5; these sets of rolls forming the rolling devices and which are geared together as illustrated in Fig. 2 and driven from the main shaft 6. It will be understood that this rolling mill, as well as the furnace, is shown in conventional form only and that other mills of this kind or of any other character may be substituted in its place, so long as the billet leaving the furnace is rolled into shape and then formed into a tube in such a manner as to save part of its original heat to which supplemental heat may be successively and progressively added to bring it to the welding point.

In the form of mill shown in the drawings the billet is shown as broken away in Fig. 1 in order to bring the furnace nearer to the rolling mill and as the billet passes through the successive passes, it is gradually rolled into shape so that at the time it passes out of the fourth "pass" designated by the numeral 5, it is of the proper thickness to be formed into the tube which the apparatus is designed to make.

The rolling mill, in addition to gradually forming the billet $a$ into a skelp, shown at $b$, $c$, $d$ and $e$, feeds the skelp in the form in which it is represented at $e$ through the bending devices shown in Figs. 1 and 2 and perspective view in Fig. 7, these devices comprising the members 8 and 10 such for example as shown in U. S. Patent No. 575,225, granted January 12, 1897 to Frick and Price. The result of the forcing of the metal through the devices 8 and 10 is to form the skelp into the shape shown at $f$ in Fig. 3 and as the skelp is pushed still further the devices 8 and 10 form it into the shape shown at $g$. The further feeding of the skelp forces it through the pair of rolls 12 and 14, the first of which has a U-shaped tongue fitting into a similarly shaped groove in the lower roll 14, these rolls also being shown in the aforesaid patent. The feeding of the skelp through these rolls brings the skelp to a U-shape as shown at $h$ in Fig. 3.

By inspecting Fig. 2 it will be seen that although the skelp is forced into the rolls 12 and 14 by the same power which rolls the billet into a skelp, the rolls 12 and 14 are nevertheless positively driven from the pair of rolls 5 of the rolling mill as seen in Fig. 2, the power being transmitted by means of sprocket wheels 16 and 18 and a sprocket chain 20. These sprocket wheels are of uniform size so that the rolls 12 and 14 move at precisely the same speed as the various sets of rolls of the rolling mill. The U-shaped skelp is now fed through the tube forming devices 22, 23 and 24 shown in Figs. 1 and 2 and in perspective view in Fig. 6, these devices being the same devices as are shown in the aforesaid patent to Frick and Price and are therefore well known in the art. The result of the passage of the U-shaped skelp through the devices 22, 23 and 24 is that the U-shaped skelp is gradually brought from the shape shown at $h$ to the shapes shown at $i$, $j$, $k$, the latter being in the form of a complete tube with its edges touching each other ready for welding, but not welded. The complete tube, which it must be remembered retains a considerable degree of heat from the heat imparted to the billet in the rolling mill heating furnace, is now fed through the supplemental heating devices so as to add to the residuary or remaining heat sufficient heat units to successively and progressively bring said remaining heat up to welding heat in order that the edges of said tube may be welded or fused.

In the form in Figs. 1 and 2, I have employed ten auxiliary heating devices arranged to burn gas and all fed from a common supply but it is to be understood that the number of these heating devices may be increased or decreased as occasion may require. For instance the heat left in the skelp after its passage from the furnace through the rolling mill and tube former may be, in a given thickness of tube, in the neighborhood of 1500 degrees, and heat is successively and progressively added to the tube as it rapidly passes through the supplemental heating devices and the number of said heating devices shown in the drawing may be sufficient for one thickness of tube while for a greater thickness a larger number may be necessary and with a thinner tube fewer heating devices will be sufficient. These heating devices, in the form which I now prefer to use them, are shown in detail in Figs. 8 and 9 and as there shown each of them consists of a tube supporting box 30 secured to a suitable support 32. Each of these supporting boxes is provided with a longitudinal chamber having a passage of the exact shape of the exterior of the tube; these chambers being constructed so that as the formed tube passes successively through the various heating devices, the tube will be held in position with its edges in the proper place to receive the supplemental heat from the various heating devices. The supporting boxes 30 are hollow and each is provided with a water inlet 34 and an outlet 36 so that it can be kept at the proper temperature notwithstanding the intense heat imparted to it. Above each of the heating devices is arranged, as shown in Figs. 1, 2, 8 and 9, a gas burner 38 arranged to impart heat to the edges of the tube which are exposed through the top of the box 30. While I have shown a series of gas burners, it will of course be understood that heat may be supplied in any of the ways now so well known and that I am not limiting my invention to a series of gas heating devices.

In the form shown in Fig. 1, assuming that the tube has remaining in it about 1500 degrees of heat, the said formed tube as it passes through the succession of supporting boxes 30 successively and progressively has additional heat units added to it by the plurality of heating devices until, by the time the tube passes out of the last heating box, it has reached at least welding heat. Then the tube at or above welding heat is fed through a welding die comprising two members 40 and 41 which are arranged to create pressure against the hot edges of the pipe which it will be remembered are at welding or fusing heat. The pipe, now welded or fused, passes through another pair of rolls 44 which may be merely driving rolls driven from the rolling mill through the rolls 12 and 14 as shown in Fig. 2 by means of the belt 46 and pulleys 47 and 48. These rolls 44 in addition to assisting the tube in its passage through the mill, may also, of course, hold its welded edges in shape. It will be observed that these rolls 44 are the only means of drawing the rear end of the tubing through the heating and welding devices after said rear end passes out of the rolls 12 and 14.

It will be observed that the water jacketed boxes 30 are of considerable length and that they are separated from each other by a small air space, and that the extent of the heat flame (if gas be used) is very limited with respect to the length of the boxes 30. The reasons for these are that, owing to the length of pipe between the jets, the great heat of the jets (which may be about twice that of welding heat) has a chance to spread, and owing to the spaces between the boxes, any scale formed on the pipe has a chance to drop away or be scraped off by the passage of the tubing through the succeeding box.

In the modified form shown in Fig. 4 I have omitted the welding dies 40 and 41 in which case the welding pressure is formed by the rollers 44. In this form of my invention I have added a second pair of forming rolls 50 which are identical with the rolls shown in the aforesaid patent of Frick and Price, No. 575,225. It will be understood that in this Fig. 4 in order to show the parts on a larger scale I have omitted a number of heating devices and have also omitted a number of the rolls of the rolling mill.

In the form shown in Fig. 9 I have shown in conventional form an electric heating device 51, and it will be understood that when electricity is the heating medium, electric heating devices of any desired kind are substituted for the gas burning devices, so as to successively and progressively augment by electric heating devices the heat remaining in the tubing in the same way as is illustrated for the gas burning devices of Figs. 1, 2 and 3.

In the modification shown in Fig. 10, I have illustrated a modification of the last of the series of water jacketed boxes. In this form the box instead of being open for its entire length is closed at the discharge end as shown at 52 in order that as the tubing goes through said end 52 the highly heated edges of the tube are held in pressing contact so that they are welded or fused together, and when this form is used the dies 40 and 41 may be dispensed with.

Notwithstanding the fact that I have quite fully disclosed my method and means for manufacturing tubing as I have described the details of the apparatus employed by me, it may nevertheless be best to repeat the operation which is as follows: The billet which is fed from the rolling mill heating furnace and which it will be understood is at about welding heat, is fed through the four pairs of rolls of the rolling mill thus bringing it from the billet shape $a$ to the shapes shown at $b$, $c$, $d$ and $e$. Then, by the same power and pressure which rolls the billet into skelp shape, the skelp, in the shape shown at $e$, is forced through the forming devices 8 and 10, shown in Fig. 7, to successively bring the skelp to the shapes shown at $f$ and $g$. Then the skelp is passed through the rolls 12 and 14 bringing it to the U-shape shown at $h$. Now the U-shaped metal, still hot, is fed through the forming devices 22, 23 and 24 so that the tube is completely formed through the stages $i$, $j$ and $k$. By this time, the heat of the skelp which it will be remembered came from the furnace at about welding heat has now been reduced by the various operations until it may be in the neighborhood of 1500 degrees. The now completely formed tube is passed through the heating boxes as rapidly as the billet is rolled into skelp shape and heat is successively and progressively added to it by the plurality of burners until the heat is increased from, say 1500 degrees, to above welding heat, when the tube is passed from the last heating device into the dies 40 and 41 where the edges are held pressed into welding or fusing contact. The tube now completely welded is passed through the rolls 44 and discharged in finished shape.

From the foregoing it will be understood that I am enabled to continuously and progressively make welded tubing from the billet which leaves the heating furnace and without losing all of the heat imparted to the billet from said furnace. In other words, after forming the hot billet into skelp shape and then into tube shape I add successively and progressively to the heat remaining in it, sufficient heat to augment the heat in the tube sufficiently to bring it to welding heat and then weld or fuse the edges. I thus make complete welded tubing from the billet in one progressive operation and believe I am the first to do this and intend the following claims to broadly protect this invention. It will of course be understood that by the use of the word "billet" I intend to cover—pile, slab—or any other form or mass of metal from which skelps are rolled.

What I claim as my invention is:—

1. That improvement in the art of forming welded tubing in one continuous operation directly from a hot billet or pile, which consists in converting said hot billet or pile into tubular skelp, while said tubular skelp is still hot—and while it is traveling at a high rate of speed through the passes of a rolling mill—progressively augmenting the heat at the meeting edges of said skelp sufficiently to bring the said edges to the welding temperature, and welding said edges together when the welding temperature is so reached.

2. The method of making tubing which method consists in rolling a heated billet into tubular form, and as it issues from the forming rolls progressively raising the edges to a welding temperature, and welding the same as it issues from the rolling and heating means.

3. The method of making tubing which method consists in feeding a hot billet to reducing rolls, rolling said billet into skelp shape, shaping said hot skelp into tube shape, utilizing the heat remaining in said tubing and in successively and progressively supplementing said remaining heat until the remaining heat and the supplemental heat reach welding heat, and welding or fusing the edges of said tube.

4. The method of making tubing which method consists in feeding a hot billet to reducing rolls, rolling said billet into skelp shape, shaping said hot skelp into tube shape, utilizing the heat remaining in said tubing and successively and progressively augmenting said remaining heat until the remaining heat plus the augmented heat reach welding heat, and welding or fusing the edges of said tubing, the successively and progressively augmented heat being applied to the tube as it issues from the tube shaping means and the welding being completed as the tube issues from the tube shaping means and heating devices.

5. In apparatus for making welded tubing, the combination of a rolling mill adapted to roll a hot billet into a skelp, means for forming the hot skelp into tube shape, means for successively and progressively adding heat units to said already heated tube until it reaches welding heat, and means for welding the edges of said tube, the speed of the material through the tube forming means and through the welding means being controlled by the rolling mill.

6. In apparatus for making welded tubing, the combination of a rolling mill adapted to roll metal from a billet into skelp shape, tube forming or shaping means adapted to receive the hot skelp from the rolling mill and shape it into tubing, means for successively and progressively adding or supplementing heat to said already heated tube, and means for drawing the finished tube from the welding device.

7. In apparatus for making welded tubing, the combination of a rolling mill adapted to roll metal from a billet into skelp shape, tube forming or shaping means adapted to receive the hot skelp from the rolling mill and shape it into tubing, means comprising a plurality of heating devices adapted to successively and progressively add or supplement heat to said already heated tube, and means for welding or fusing the edges of said tube.

8. In apparatus for making welded tubing, the combination of a rolling mill adapted to roll metal from a billet into skelp shape, tube forming or shaping means adapted to receive the hot skelp from the rolling mill and shape it into tubing, means comprising a plurality of water jacketed heating devices adapted to successively and progressively add or supplement heat to said already heated tube, and means for welding or fusing the edges of said tube.

9. In apparatus for making welded tubing, the combination of a rolling mill adapted to roll metal from a billet into skelp shape, tube forming or shaping means adapted to receive the hot skelp from the rolling mill and shape it into tubing, means comprising a plurality of heating devices adapted to successively and progressively add or supplement heat to said already heated tube, said heating devices having a space between them.

10. In apparatus for making welded tubing, the combination of a rolling mill adapted to roll a billet into a skelp, means for forming a skelp into tube shape, means for successively and progressively adding heat units to said already heated tube until it reaches welding heat, and means for welding the edges of said tube, the aforesaid rolling mill forcing the skelp through the tube forming and welding devices.

11. In apparatus for making welded tubing, the combination of a rolling mill adapted to roll a hot billet into a skelp, means for forming the hot skelp into tube shape, means for successively and progressively adding heat units to said already heated tube until it reaches welding heat, means for welding the edges of said tube, and rolls for drawing the finished tube from the heating devices, the rolling mill, the feeding and the drawing rolls being driven synchronously.

12. In apparatus for making welded tubing the combination of a rolling mill adapted to roll metal from a billet into skelp shape, tube forming or shaping means adapted to receive the hot skelp from the rolling mill and shape it into tubing, and means for successively and progressively adding or supplementing heat to said already heated tube, as the tube issues from the tube forming means, said heating means comprising a series of heating devices, and means for supporting the tubing as it passes under the influence of said heating devices, comprising a series of boxes each having a longitudinal chamber in which the bottom and sides of the tubing is supported and each chamber being open at the point where the tubing is exposed to the heat.

13. In apparatus for making welded tubing the combination of a rolling mill adapted to roll metal from a billet into skelp shape, tube forming or shaping means adapted to receive the hot skelp from the rolling mill and shape it into tubing, and means for successively and progressively adding or supplementing heat to said already heated tube, as the tube issues from the tube forming means, said heating means comprising a series of heating devices, and means for supporting the tubing as it passes under the influence of said heating devices, comprising a series of water jacketed boxes each having a longitudinal chamber in which the bottom and sides of the tubing is supported and each chamber being open at the point where the tubing is exposed to the heat.

14. In apparatus for making welded tubing, the combination of heating devices, and means for supporting the tubing as it passes under the influence of said heating devices, said supporting means comprising a series of water jacketed boxes each having a longitudinal chamber for the passage of the tubing and each chamber being open at the point where the tubing is exposed to the heat, the last of said boxes also forming the welding device as the tube passes through it.

Signed by me at Washington, D. C. this 4th day of March 1908.

WILLIAM C. FRICK.

Witnesses:
 THOS. E. ROBERTSON,
 ARTHUR E. DOWELL.